United States Patent
Olmstead et al.

(10) Patent No.: US 12,141,527 B2
(45) Date of Patent: Nov. 12, 2024

(54) EXPERT KNOWLEDGE PLATFORM

(71) Applicant: ROYAL BANK OF CANADA, Montreal (CA)

(72) Inventors: Gregory Andrew Olmstead, Toronto (CA); Eric Rumfels, Toronto (CA); Aditi Miglani, Toronto (CA); Sahba Ezami, Toronto (CA); Ada Cristiana Ene, Toronto (CA); Dhanush Dharmaretnam, Toronto (CA); Stephen Bain, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 1180 days.

(21) Appl. No.: 15/998,878

(22) Filed: Aug. 16, 2018

(65) Prior Publication Data

US 2019/0057310 A1 Feb. 21, 2019

Related U.S. Application Data

(60) Provisional application No. 62/546,157, filed on Aug. 16, 2017.

(51) Int. Cl.
| | |
|---|---|
| *G06F 40/295* | (2020.01) |
| *G06F 18/22* | (2023.01) |
| *G06F 18/24* | (2023.01) |
| *G06F 40/211* | (2020.01) |
| *G06F 40/216* | (2020.01) |
| *G06F 40/284* | (2020.01) |
| *G06F 40/30* | (2020.01) |
| *G06N 3/042* | (2023.01) |
| *G06N 3/044* | (2023.01) |

(Continued)

(52) U.S. Cl.
CPC ............ *G06F 40/295* (2020.01); *G06F 18/22* (2023.01); *G06F 18/24* (2023.01); *G06F 40/211* (2020.01); *G06F 40/216* (2020.01); *G06F 40/284* (2020.01); *G06F 40/30* (2020.01); *G06N 3/042* (2023.01); *G06N 3/044* (2023.01); *G06N 5/01* (2023.01); *G06N 5/02* (2013.01); *G06N 5/022* (2013.01); *G06N 7/01* (2023.01); *G06N 20/00* (2019.01)

(58) Field of Classification Search
CPC .... G06F 40/211; G06F 40/216; G06F 40/284; G06F 40/295; G06F 40/30; G06F 18/22; G06F 18/24; G06N 5/02; G06N 3/0427; G06N 3/0445; G06N 5/003; G06N 5/022; G06N 7/005; G06N 20/00; G06N 3/044; G06N 5/01

See application file for complete search history.

(56) References Cited

U.S. PATENT DOCUMENTS

| | | | | | |
|---|---|---|---|---|---|
| 2012/0078918 | A1* | 3/2012 | Somasundaran | ..... | G06F 40/295 707/748 |
| 2012/0313948 | A1* | 12/2012 | Bergman | ................ | G06F 16/35 345/440 |

(Continued)

*Primary Examiner* — Weiming He
(74) *Attorney, Agent, or Firm* — Norton Rose Fulbright Canada LLP

(57) ABSTRACT

An expert system processes communication data to extract entities and topics. The expert system generates relationship graphs and relationship scores between the entities and topics. The system can identify entities that are expert in a given topic. The expert system uses a knowledge engine to provide different services and applications.

18 Claims, 5 Drawing Sheets

(51) Int. Cl.
*G06N 5/01* (2023.01)
*G06N 5/02* (2023.01)
*G06N 5/022* (2023.01)
*G06N 7/01* (2023.01)
*G06N 20/00* (2019.01)

(56) References Cited

U.S. PATENT DOCUMENTS

| | | | |
|---|---|---|---|
| 2014/0074843 A1* | 3/2014 | White | G06F 16/285 |
| | | | 707/737 |
| 2015/0081725 A1* | 3/2015 | Ogawa | H04L 67/535 |
| | | | 707/754 |
| 2016/0314126 A1* | 10/2016 | Malik | G06F 16/9024 |
| 2017/0052949 A1* | 2/2017 | Baldwin | H04L 51/216 |
| 2017/0111462 A1* | 4/2017 | Oberli | H04L 67/535 |
| 2017/0249388 A1* | 8/2017 | Alonso | G06Q 50/01 |
| 2017/0344711 A1* | 11/2017 | Liu | G06N 5/022 |
| 2018/0365592 A1* | 12/2018 | Gu | G06F 16/353 |
| 2019/0179812 A1* | 6/2019 | Chandrasekaran | G06F 16/243 |

* cited by examiner

EXPERT KNOWLEDGE PLATFORM

FIELD

The present disclosure generally relates to the field of artificial intelligence, machine learning, natural language processing, and communications.

INTRODUCTION

Identifying experts in an organization can be difficult particularly if the organization includes many experts in different subject areas.

Electronic communications include e-mail messages, instant messages, Short Message Service messages, application messages, social media messages, and so on. Electronic communication content can refer to people, places, organizations, and topics. An electronic communication can relate to a sender and receiver(s).

Machine learning is a field of computer science and artificial intelligence that gives computers the ability to generate code without being explicitly programmed to improve processes. Machine learning is a data analysis technique that automatically builds statistical models by iteratively learning from data. Machine learning uses the statistical models to automatically process data and make decisions.

Natural language processing (NLP) is a field of computer science, artificial intelligence, and computational linguistics that relates to human and computer interactions and natural language understanding. NLP can enable computers to derive meaning and understanding from human or natural language input.

SUMMARY

Embodiments described herein relate to a system for identifying subject matter experts in an organization by analyzing communications using machine learning and natural language processing to extract entities and topics.

Embodiments described herein relate to an artificial intelligence (AI) platform that can process communication data such as emails, chats and other forms of textual communication and surface topics of interest and subjects of discussion and store data as a dictionary.

In accordance with an aspect, there is provided a knowledge platform. The platform has an interface to receive a request identifying a topic, the request from a requestor. The platform has at least one processor configured to: receive electronic communication data; process the communication data using an entity recognition model to extract one or more named entities and one or more topics, the topic of the request being part of the one or more topics; classify, using an expert classifier, an expert entity from the one or more named entities as an expert in the topic of the request based on a distance threshold; generate, using a relationship model, a relationship score indicating strength of a relationship between the requestor and the expert entity. The platform has a presentation server configured to generate visual effects representing the one or more named entities and the one or more topics, and a relationship path between the requestor and the expert entity, the interface displaying the visual effects at a device.

In some embodiments, the entity recognition unit recognizes the one or more entities and the topics in the communication data using a named entity recognizer, a dependency parser and a topic modeller.

In some embodiments, the processor uses the relationship model generates a relationship graph using at least some of the named entities and computes the relationship path using the relationship graph, wherein the presentation unit generates a visual element corresponding to the relationship path and at least a portion of the relationship graph.

In some embodiments, the processor is configured to use a cosine similarity measure for the expert classifier to classify the expert entity as the expert in the topic.

In some embodiments, the electronic communication has a reference to at least one of a sender and a recipient, wherein the processor generates additional relationship scores to indicate strength of a relationship between the sender or the recipient and the one or more named entities, wherein the additional relationship scores are used to generate the relationship path between the requestor and the expert entity.

In some embodiments, the processor is configured to generate or update one or more knowledge bases with the one or more named entities and the topics.

In some embodiments, the entity recognition unit validates the one or more entities using a lexical source.

In some embodiments, the entity recognition unit extracts the one or more named entities by filtering with a knowledge graph.

In some embodiments, the named entity recognition unit extracts the one or more topics using topic modeling.

In some embodiments, the relationship model processes the electronic communication using classification rules to compute the relationship score based on a sentiment score, the classification rules comprising natural language processing rules for sentiment classification.

In some embodiments, the relationship model processes the electronic communication using classification rules to compute the relationship score based on a formality score, the classification rules comprising natural language processing rules for formality classification.

In some embodiments, the relationship model processes the electronic communication using classification rules to compute the relationship score based on a duration score, the classification rules comprising rules for time stamp processing and duration calculations.

In accordance with an aspect, there is provided a knowledge platform with: an interface to receive electronic communication data; at least one processor configured to provide a named entity recognition unit to process the communication data to extract one or more named entities and topics referred to in the electronic communication data; and a presentation server configured to generate visual effects representing the one or more named entities and topics.

In some embodiments, the named entity recognition unit recognizes the one or more entities and the topics in the communication data using an entity recognizer and a dependency parser.

In some embodiments, the processor is configured to generate or update one or more knowledge bases with the one or more named entities and the topics.

In some embodiments, the named entity recognition unit validates the one or more entities using a lexical source.

In some embodiments, the named entity recognition unit extracts the one or more named entities by filtering with a knowledge graph.

In some embodiments, the named entity recognition unit extracts the one or more named entities by syntactic dependency parsing.

In some embodiments, the named entity recognition unit extracts the one or more named entities by identifying entities with topic modeling.

In some embodiments, the processor is configured to generate an expert classifier to classify an expert entity from the one or more named entities that is expert in a topic of the topics.

In some embodiments, the electronic communication has a reference to at least one of a sender and a recipient, the at least one processor is further configured to provide a relationship unit to determine a relationship score indicating strength of a relationship between a first entity and a second entity, the first entity and the second entity being at least one of the sender, the recipient or the one or more named entities.

In some embodiments, the relationship unit processes the electronic communication using classification rules to compute the relationship score based on a sentiment score, the classification rules comprising natural language processing rules for sentiment classification.

In some embodiments, the relationship unit processes the electronic communication using classification rules to compute the relationship score based on a formality score, the classification rules comprising natural language processing rules for formality classification.

In some embodiments, the relationship unit processes the electronic communication using classification rules to compute the relationship score based on a duration score, the classification rules comprising rules for time stamp processing and duration calculations.

In some embodiments, the relationship unit generates a relationship graph and computes one or more paths between the first entity and the second entity, wherein the presentation unit generates a visual element corresponding to the one or more paths and at least a portion of the relationship graph.

In some embodiments, the processor is configured to use a cosine similarity measure for the expert classifier to classify the expert entity that is expert in the topic.

In another aspect there is provided a method that involves receiving electronic communication data; processing the communication data to extract one or more named entities and topics referred to in the electronic communication data; determining an expert entity for a topic based on a distance threshold; updating a knowledge engine with the expert entity, the one or more named entities and topics; and providing an application that generates visual effects representing the expert entity; the one or more named entities and topics.

In another aspect there is provided a search engine application platform with: an interface to receive electronic communication data and a search topic; at least one processor configured to provide: a named entity recognition unit to process the communication data to extract one or more named entities and topics referred to in the electronic communication data; an expert classifier to determine an expert entity for a topic based on a distance threshold; and an interface application configured to provide access to a knowledge engine with the expert entity and the one or more named entities and topics.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Embodiments described herein relate to a system for identifying subject matter experts in an organization by analyzing communications using machine learning.

Figure 1:
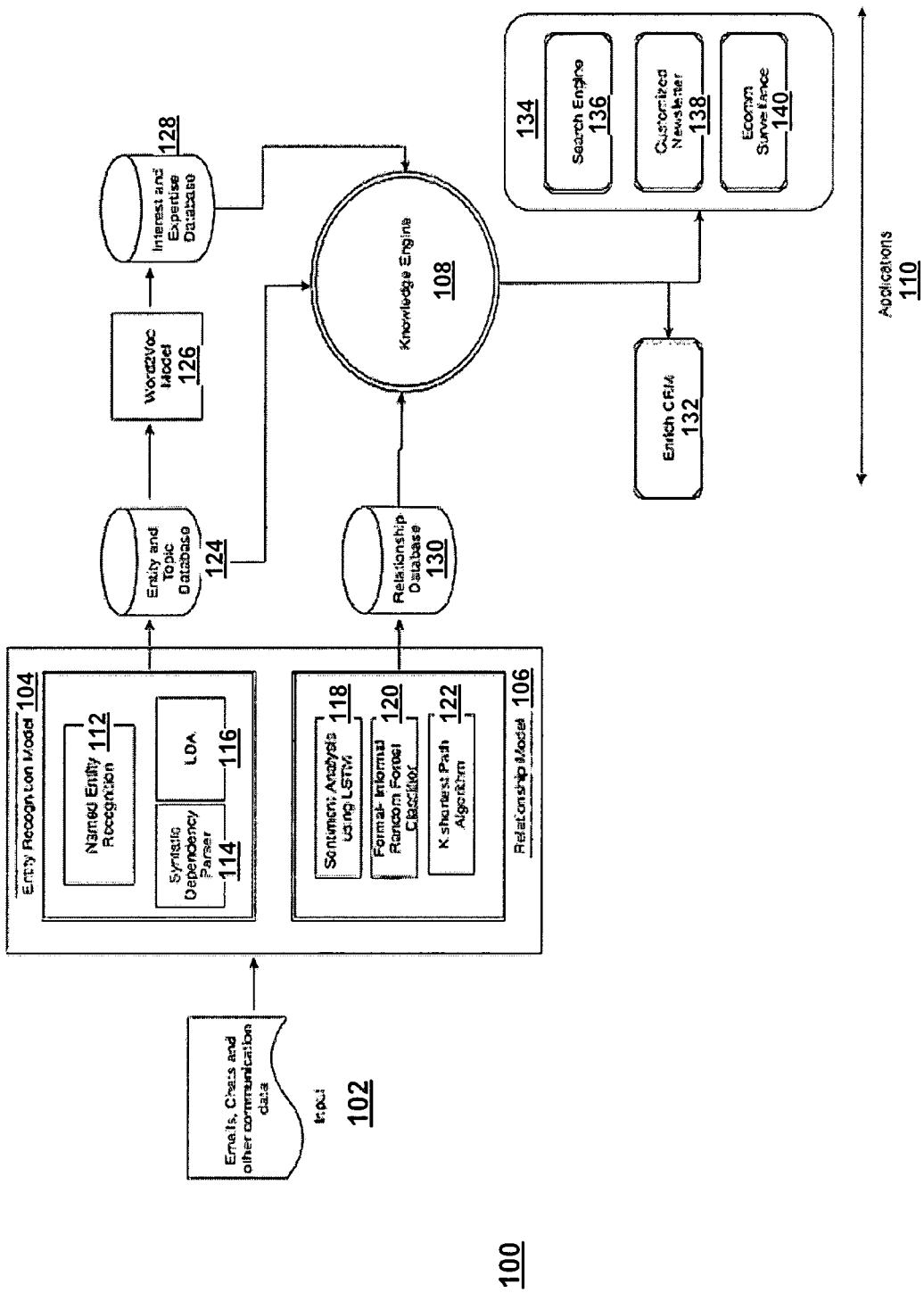
FIG. 1 is an example architecture diagram of a system for surfacing knowledge using Artificial Intelligence (AI) processes.

FIG. 1 is a schematic view of a system 100 for electronic communications according to embodiments described herein. Example electronic communications include e-mail messages, instant messages, Short Message Service messages, application messages, social media messages, and so on. Electronic communications can also be based on voice communications (e.g. phone calls, video conferencing, voicemail messages). Electronic communications can have a sender, recipients and other participants which may all be referred to as contacts. Additional contacts can be referred to within the content of the electronic communications. Electronic communications can refer to contacts or people, places, organizations and other topics, which may be referred to as named entities. The system 100 processes electronic communications using machine learning and natural language processing to discover one or more named entities.

The system 100 receives input data 102 from electronic communications. The system 100 has an interface to receive a request identifying a topic, the request from a requestor. The system 100 processes the communication data using the entity recognition model 104 to extract one or more named entities and one or more topics, the topic of the request being part of the one or more topics. The system 100 can classify, using an expert classifier, an expert entity from the one or more named entities as an expert in the topic of the request based on a distance threshold. The system 100 can generate, using a relationship model 106, a relationship score indicating strength of a relationship between the requestor and the expert entity. The system 100 has a presentation server configured to generate visual effects representing the one or more named entities and the one or more topics, and a relationship path between the requestor and the expert entity. The interface displays the visual effects at a device in response to the request.

The system 100 includes an entity recognition unit 104 to process the input data 102 to identify entities and topics to populate an entity and topic database 124 and a knowledge engine 108. The entity recognition unit 104 includes a named entity recognition unit 112, a syntactic dependency parser 114 and a latent Dirichlet allocation unit 116. The system 100 includes a relationship unit 106 to process the input data 102 to generate a relationship score and a relationship graph for the entities and topics in the knowledge engine 108. The relationship unit 106 includes a sentiment classifier 118, a formality classifier 120, and a path unit 122. The path unit 122 can generate a relationship graph with nodes that correspond to different entities and topics and edges that correspond to relationship scores between the entities and topics. The path unit 122 can use the relationship graph to define different relationship paths between the nodes (entities and/or topics) to connect different entities and topics. For example, a relationship path can connect a requestor that has submitted a request to the system 100 in relationship to a topic to an expert entity that is expert in the topic. The relationship path can suggest a route for connecting the requestor with the expert. This may include intermediate entities (people or organizations for example) that the requestor can ask for an introduction to the expert. There may be multiple paths connecting the requestor to the expert entity in the relationship graph and the path unit 122 can suggest an optimal path based on the edges or scores, for example, or the length of path, as another example. There may also be multiple experts for the topic and the path unit 122 can suggest the best expert based on the relationship graph and the path connecting the candidate expert to the requestor.

The relationship unit 106 populates relationship database 130 in the knowledge engine 108 with the relationship graph including the nodes (entities, topics) and edges (scores). The system 100 can include an expert classifier 126 to determine an expert score for entities in relation to different topics. An entity may have an interest in a topic and another entity that is an expert in the topic. The knowledge engine 108 can service a search engine 130 such that an entity with an interest in a topic can search for another entity that is an expert in the topic. In response, the system 100 can update an interface to indicate a relationship path between the entity that has an interest in the topic and the expert entity that is expert in the topic. The relationship path can be computed using a relationship graph and scores, for example.

The system 100 implements AI techniques to process input data 102 including electronic communication data such as emails, chats and other forms of textual communication and surface topics of interest and subjects of discussion, as named entities. The system 100 can then store the identified named entities as a dictionary. This dictionary of named entities can consist of people, places, organizations and other topics which are extracted from the communication data. The system 100 implements AI techniques such as machine learning and natural language processing technologies.

The system 100 can understand relationships between contacts by processing the input data 102 (e.g. communication data). The system 100 can implement a relationship model 106 to take into account sentiment of exchanges, formality of the conversation, the number of exchanges and duration two contacts have known each other, for example. The contacts can be a sender and a recipient of an electronic communication. All these features can be combined into a heuristic which assigns an aggregate relationship score to define the relationship (e.g. strength of relationship) between two contacts.

The system 100 can segregate contacts who are experts in certain topics (or named entities) as compared to those contacts who have just expressed interest in them. An example technique involves training using models that generate or learn vector representations of words. The vectors can be compared to compute similarity or distance metrics, for example. Example models include a Word2vec model on the Noun Entities (e.g. of the named entities) which were recognized in a document as compared to the entire text. Word2vec is a group of related models that are used to produce word embeddings or vector representations of words. The model can take as its input a large corpus of text and produces a vector space, with each unique word in the corpus being assigned a corresponding vector in the space. Word vectors are positioned in the vector space such that words that share common contexts in the corpus are located in close proximity to one another in the space.

The system 100 provides a platform for expert knowledge that can be referred to as SKAI (Surfacing Knowledge using Artificial Intelligence). The system 100 can read electronic communication data which involves emails, chats, RFQs (Request for Quote), transcribed calls and speech and surfaces topics of interest and subjects of discussion. That is, system 100 processes electronic communication data to identify named entities. The system 100 or SKAI can be built with various machine learning models to understand sentiments of these communications and determine the relationships between contacts. The system 100 is a real time system which updates its knowledge base created by surfacing topics and other named entities (People, Places, Organizations) discussed in the communication data on a regular basis. The system 100 can generate a weight metric based on frequency of use, for example. The system 100 can keep track of even the most esoteric content shared through the emails or other electronic communications and disseminates that information among people who are interested in them, subject to access controls and privileges.

Knowledge engine 108 creates and updates a dictionary of named entities which includes People, Organization, Places, Topics and Subjects of discussion (also referred to as named entities). Knowledge engine 108 creates and updates a graph of entities and topics, including relationship scores between the entities and topics. The graph can be referred to as a relationship graph, for example. The system 100 can use the relationship graph to generate paths between different entities and topics. For example, a path can connect an entity to another entity and can be used to suggest different ways for the first entity to connect to the other entity. The relationship graph can include notes that correspond to different named entities and topics along with edges that correspond to scores between the different nodes. The knowledge engine 108 can be continually updated as the system 100 processes new electronic data to extract more entities and topics or to further update scores computed between entities and topics. The relationship graph can be used to suggest a path between an entity interested in a topic and an expert entity that is expert in the topic. The relationship graph can also be referred to as a knowledge graph for example. The edges can represent different types of scores and are not limited to relationship scores. For example the edges can represent a similarity between two topics or entities, for example. As another example the edges can represent a distance metrics between two topics or entities.

Named Entity and Topic Recognition

System 100 includes an entity recognition unit 104 with components such as a named entity recognition unit 112, syntactic dependency parser 114 and a latent Dirichlet allocation (LDA) 116.

Named-entity recognition unit 112 is a subtask of information extraction that seeks to locate and classify named entities in text into pre-defined categories such as the names of persons, organizations, locations, expressions of times, quantities, monetary values, percentages, and so on. In information extraction, a named entity is an object, such as persons, locations, organizations, products, etc., that can be denoted with a proper name. It can be abstract or have a physical existence. Named-entity recognition unit 112 processes electronic communication data to identify named entities and assign labels or tags (such as person, place, organization) to words. The labels and the associated words can be stored in the entity and topic database 124 or knowledge engine 108. The text can be broken down into different tokens and one or more tokens can be assigned a label that indicates a named entity. A named entity generally relates to an entity for which one or more strings such as words or phrases consistently represents a referent. The named entity recognition unit 112 can detect the names and then classify the names by the type of entity they refer to. This can involve segmentation by extracting tokens and using the tokens to detect names. The classification can involve an ontology by which to organize or categorize the detected names. The named entity recognition unit 112 can also compute an accuracy score based on the detection or classification. The named entity recognition unit 112 can be trained using a domain specific model or multiple domain models.

Syntactic dependency parser 114 can parse natural language to identify and model relationships or dependencies between words. Dependency is the notion that linguistic units, e.g. words, are connected to each other by directed links. A part-of-speech (POS) category such "noun," "verb," or "preposition" designates a group of words with certain properties. Several POS categorization schemes, or tag sets, exist for English and other languages. A dependency parse represents the syntactic structure of a sentence in terms of relations between tokens. For example, a verb is linked to its dependents (arguments/modifiers). The relations can be modeled by a tree or tree-like graph. A dependency parse represents the syntactic structure of a sentence using relationships between tokens are words of the sentence. These relationships can be used to form a tree or treelike graph. The relationships between words can be used to extract topics and entities. An entity or topic can actually be a group of words and the relationships can be used to provide context or understanding of the entity or topic. The computed relationships can be used for the knowledge graph, for example. As noted, the knowledge graph can be used to compute pass between different entities and topics.

LDA 116 can implement a generative statistical model that allows sets of observations to be explained by unobserved groups that explain why some parts of the data are similar. An electronic communication may be viewed as a mixture of various topics where each document is considered to have a set of topics that are assigned to it via LDA 116. The LDA 116 can assume the topic distribution has a sparse Dirichlet prior. The sparse Dirichlet priors encode the intuition that documents cover only a small set of topics and that topics use only a small set of words frequently. In practice, this can result in a better disambiguation of words and a more precise assignment of documents to topics. The LDA 116 is an example probabilistic latent semantic analysis model. In some embodiments, system 100 can implement other probabilistic latent semantic analysis models. The LDA 116 can be used to identify entities and topics and to compute relationships between the entities and topics. The computed relationships can be used for the knowledge graph, for example.

The entity recognition unit 104 extracts entities and topics from emails and other communication data such as chats. The entity recognition unit 104 extracts entities and topics from communications using a wide variety of language styles (formal, informal, SMS language, short forms, etc.) which are used in communication data. Electronic communication data may not follow any grammatical patterns which might be used for natural language libraries and toolkits (e.g. NLTK or the Natural Language Tool Kit) to perform entity recognition. The entity recognition unit 104 can combine and use various knowledge bases (e.g. Google Knowledge Graph, BabelNet, trained WordNets) entity recognizers and dependency parsers (e.g. Spacy).

Figure 2:
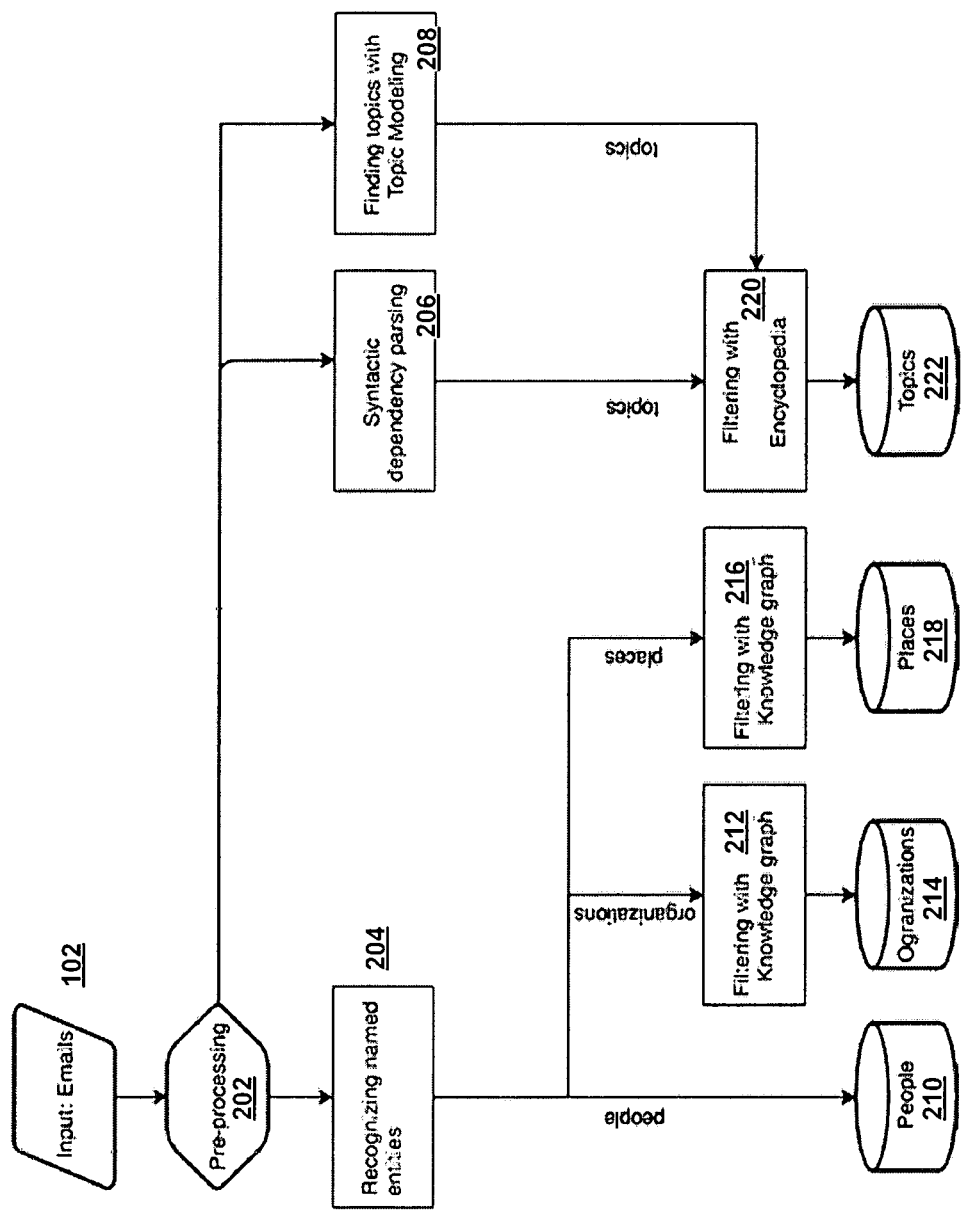
FIG. 2 is an example flowchart diagram of a process for named entity recognition.

FIG. 2 is an example flowchart diagram of a process for entity recognition unit 104. The entity recognition unit 104 can identify people, organizations, and places within electronic communication data. An example embodiment can involve the Spacy Dependency parser to identify topics which includes words like {law, oil, stocks, energy, market, fuel} and other entities of interest in datasets. However, due to noise in the electronic communication data, some of the entities and topics recognized can include stop words, misspelled words, and other forms of non-language characters. The entity recognition unit 104 can rely on a lexical source to validate the words which were extracted and reduce the noise content in the knowledge engine 108.

To reduce the noise, the entity recognition unit 104 can use a combination of a knowledge graph and multilingual dictionary, network and ontology, for example. In some embodiments, other knowledge graphs can be used. A knowledge graph is a knowledge base to enhance results with semantic information gathered from a wide variety of sources. An API can be used to search a knowledge source for places, organizations and topics. If the word searched is not a valid one, the knowledge graph returns none, otherwise, it returns a detailed description of the closest matched entity which was extracted from the electronic communication data. A knowledge base can store complex structured and unstructured information used by a computer system. A knowledge base can have structured and unstructured data. In addition to tables or vectors with numbers and strings, a knowledge base can have pointers to other objects that in turn have additional pointers. An example representation for a knowledge base can be an object model (or an ontology) with classes, subclasses, and instances. A knowledge base can model facts about named entities (people, places and things) and how these entities are connected. A knowledge graph can be constructed using a knowledge base. If the entity recognition unit 104 were to discard all the entities which were not matched by the knowledge graph, then this may risk losing some esoteric or useful information from the electronic communication data. Accordingly, the entity recognition unit 104 can combine a knowledge graph with other semantic networks and ontologies.

In some embodiments, entity recognition unit 104 implements defense against noise and valuable information loss using one or more additional multilingual lexicalized semantic networks and ontologies.

For example, BabelNet is a multilingual lexicalized semantic network and ontology developed at the Linguistic Computing Laboratory in the Department of Computer Science of the Sapienza University of Rome. BabelNet was automatically created by linking Wikipedia to the most popular computational lexicon of the English language, WordNet. The integration is performed by means of an automatic mapping and by filling in lexical gaps in resource-poor languages with the aid of statistical machine translation. The result is an "encyclopedic dictionary" that provides concepts and named entities lexicalized in many languages and connected with large amounts of semantic relations. Additional lexicalizations and definitions are added by linking to free-license wordnets, OmegaWiki, the English Wiktionary, Wikidata, FrameNet, VerbNet and others. Similarly to WordNet, BabelNet groups words in different languages into sets of synonyms, called Babel synsets. For each Babel synset, BabelNet provides short definitions (called glosses) in many languages harvested from both WordNet and Wikipedia. BabelNet is a free API which can be searched for any lexical sources. In some embodiments, the entity recognition unit 104 can use BabelNet to discard anything that is not a noun Nouns include all the people, places, organizations and topics that the system is interested in. In case an item is not found on BabelNet, it is highly likely to be a misspelled word.

The entity recognition unit 104 can also discard any verbs, pronouns, connectors and other grammar related words misidentified by a syntactic dependency parser 114 (e.g. Spacy) as a Noun Entity. By combining the results of named entity recognition unit 112, syntactic dependency parsing unit 114, semantic network (e.g. BabelNet), and knowledge base (e.g. Google Knowledge graphs), the entity recognition unit 104 creates a dictionary of named entities which includes People, Organization, Places, Topics and Subjects of discussion (also referred to as knowledge engine 108).

The topics of discussion can be identified by LDA 116 which can be trained using a vector space and topic model (e.g. Gensim). A topic model is a type of statistical model for discovering the abstract "topics" that occur in a collection of documents. The "topics" produced by topic modeling techniques can be clusters of similar words. A topic model includes a mathematical framework, which allows examining a set of documents and discovering, based on the statistics of the words in each, what the topics might be and what each document's balance of topics is. A vector space model is for representing text documents (and any objects, in general) as vectors of identifiers, for example, index terms.

Once the topics of the electronic communication data are identified, LDA 116 can be used to cluster the document into topic categories. Some examples of topics include privacy, compliance, transmission, information, credit, energy, gas, fuel, oil, and so on. The topics identified using LDA were further refined to include only top portion (e.g. 65) of important topics. The key topic words identified using LDA 116 can also be identified by the dependency parser 114. The dependency parser 114 can use a syntactic parser which helps to recognize the nouns, verbs, pronouns, and so on. The entity recognition unit 104 can select only the nouns identified in the document or electronic communication using the dependency parsing unit 114.

The information surfaced using the system 100 can be indexed and stored in a data storage device and databases (e.g. Cassandra or an NoSQL database). This knowledge can also be supplemented further using information from existing employee databases, customer relationship management systems, and so on.

An example process of entity recognition unit 104 is described by the flowchart in FIG. 2. At 202, the entity recognition 104 processes the input data 102. At 204, the entity recognition unit 104 recognizes named entities in the input data 102. The entity recognition unit 104 extracts people into a people database 210. The entity recognition unit 104 extracts organizations that are filtered with a knowledge graph 212 to populate an organization database 214. The entity recognition unit 104 extracts places that are filtered with a knowledge graph 216 to populate a places database 218. The entity recognition unit processes the input data using syntactic dependency parsing at 206 to extract topics. The entity recognition unit 104 processes the input data to find topics with topic modelling 208. The entity recognition unit 104 filters the topics with an encyclopedia 220 to populate a topics database 222.

Expert Classifier

Embodiments described herein provide an expert classifier that can identify an entity that has an interest in a topic and classify an entity as an expert in a topic. For example, the expertise classifier can be implemented using Word2vec. System 100 can include a Word2Vec model 126 that can process an entity and topic database 124 to generate or update an interest and expertise database 128.

In an aspect, system 100 is operable to differentiate between people who have expertise in a topic and people who just have expressed interest on a topic, for example. The system 100 can use a threshold metric that relates to expert classification, for example. An expert score can be computed for an entity in relation to a topic. The score can be compared to the threshold to classify the entity as an expert entity in relation to the topic. A topic can also be pre-processed to identify similar topics and a score can be computed in relation to the entity and the similar topics to further expand the metrics or input used to compute an expert score. An example expert classifier is based on the concepts of Word2vec or another model that converts words to vector representations. In Word2vec, words are represented by N dimensional vectors and an example intuition is that words which are similar lie very close to each other in vector space. The distance between two vectors in a high dimensional space can be measured with cosine distance, for example. Word2vec models can include two example types—Continuous Bag of Words (CBOW) and SkipGram.

System 100 can use CBOW model for the Word2vec model 126 which is like "predicting a word using its context". The models can be trained using Gensim, using a window size of 20 and the size of vectors which equals 300 dimensions, for example. Some of the electronic communications in the dataset can be large and usually a large window size can help to get the whole electronic communication of entities into context when it is trained. This can help make sure that no association between entities is lost.

Figure 3:
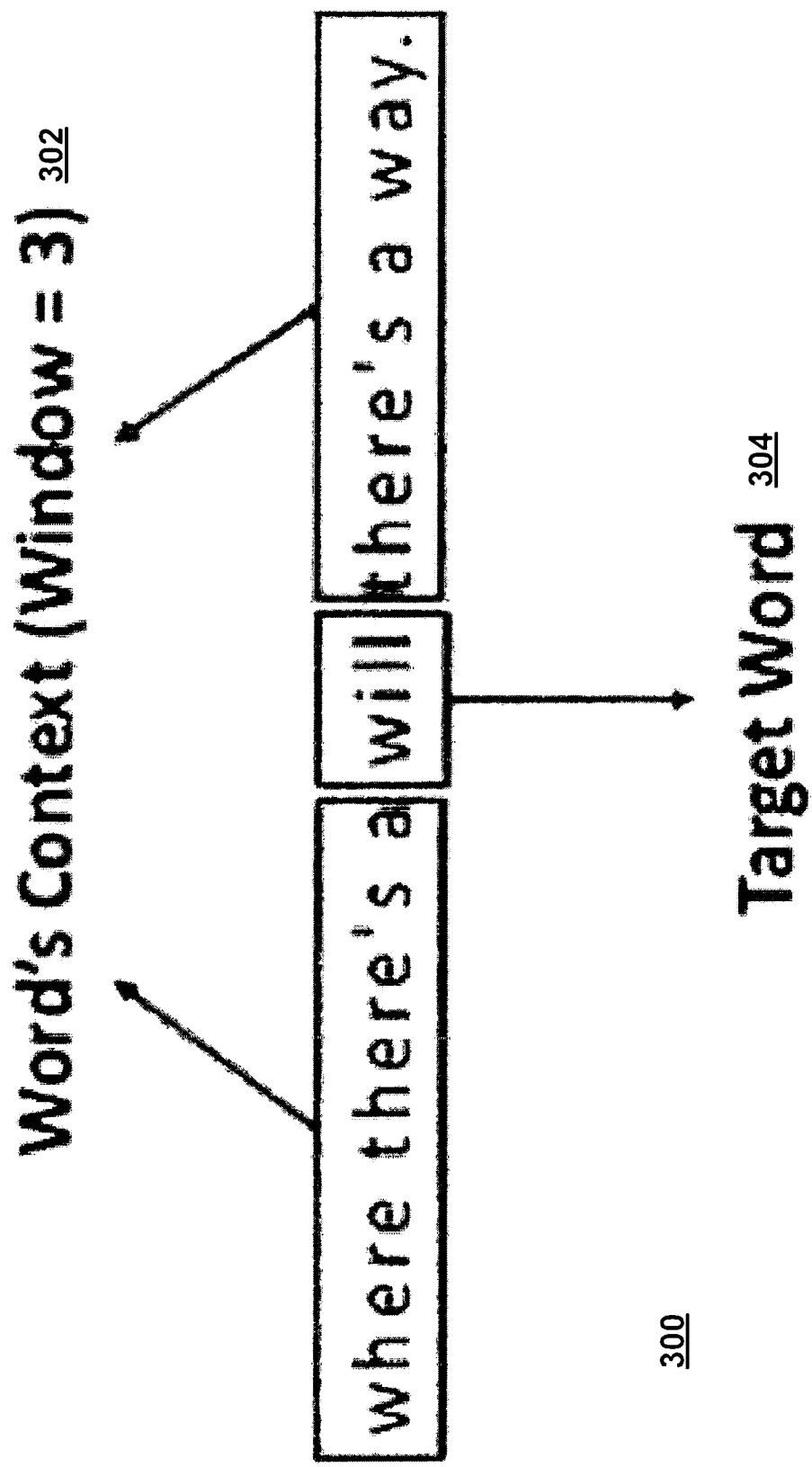
FIG. 3 is an example work context diagram.

FIG. 3 is an example work context diagram. The model 126 determines a window size for a target word in order to determine the context 302. The window is used to group words proximate to the target context. The window size can vary to keep proximate words together.

The training documents can be prepared by removing all the stop words and language words such as connectors, verbs, pronouns, and so on. In an example, the system 100 can use only the Names, Places, Organizations, and the topics that were identified using the named entity and topic recognition models (e.g. entity recognition unit 104). In contrast, for existing models the entire document with all the words is used to train the Word2vec. Unfortunately, this can cause important entities and word relationships to be separated away from one another which can result in information loss. The Word2vec models are generally trained on shallow neural networks and cannot remember information beyond certain window size. Embodiments described herein can prevent loss of information when associating people with topics.

Once the model is trained it can assign topics, organizations, and people in a fixed position in a 300 dimensional vector space. System 100 can then use cosine similarity to measure the relationship between a person and topic. For example a cosine similarity between a topic 'OIL' and a person 'Jeana Mac' results in a score of 0.567 whereas a cosine similarity between a topic 'Credits' and 'Jeana Mac' results in a score of −0.123. This means that 'Jeana Mac' has interests in oil topics as compared to credits. This is an example distance measure or metric that can be used for expert classification.

When a Word2vec model is trained, it takes into account the context in which two words are used together. Words which are used in similar context or are used together frequently in various emails and chats are clustered together in vector space. Intuitively, if a person is an expert in a topic, they will usually be referenced more in the same document as the topic as compared to other people who have expressed interest in the topic. Embodiments described herein can select a similarity threshold to determine interest and expertise. The similarity threshold can be compared to a computed score for an entity in relation to a topic to determine if they are expert in the topic. As an example, system 100 can use a selected threshold of 0.75 cosine distance as a threshold for expertise. This similarity threshold varies from dataset to dataset. On a small dataset the system 100 can set much lower thresholds because they contain sparse information leading to less discussion on a topic or less experts in topics.

The same trained model can be used to identify associations between people and people's association with other organizations or entities. This kind of knowledge base forms the basis of a search engine 136 (e.g. a product of SKAI).

Relationship Models

The system 100 includes a relationship unit 106 to determine and measure relationship scores between entities. The relationship unit 106 can use sentiment and formality measurements, for example. The sentiment and formality measurements can be used to compute a score. The score can be used to define and weight an edge in a relationship graph between entities and/or topics. This graph can be used to generate a path and the path can be displayed at an interface, for example. The score can be shown along with the path.

The relationship unit 106 can include sentiment analysis unit 118. Sentiment analysis unit 118 can be used to determine whether a piece of communication data contains positive or negative sentiments. The relationship unit 106 can use an Long short-term memory (LSTM) model. For example, relationship unit 106 can leverage OpenAI, which is an open source one layer multiplicative LSTM consisting of 4096 neurons. As an example prototype, the neural network can be trained (e.g. for one month) across four NVIDIA Pascal GPUs, on a corpus of 82 million reviews with the goal of predicting the next character of text. From this model, one of the 4096 neurons can be specialized with an activation range of [−1.5,1.5] to detect positive and negative sentiments. The system 100 can pass an email through the neural network in order to classify emails in this way. The sentiment score can then be normalized. The resulting sentiment score makes up one variable in the heuristic relationship score, a score used to determine closeness between individuals (or other entities) or the strength of the relationship.

The relationship unit 106 can include a formality analysis unit 120. The formality analysis unit 120 can use a machine learning technique to classify a piece of communication as formal/informal. The formality analysis unit 120 can be trained on various classifiers on different features that are typical of formal data (consisting news articles) and informal data (consisting of tweets).

Example features for formality analysis unit 120 can include:

Formal words
Informal words
Contractions
Abbreviations
Active/Passive voice
Phrasal verbs
Word length average
Type/Token ratio (number of words in a given text)

For an example embodiment, the system 100 can use a random forest classifier with 75 estimators, 3 fold cross validation, the classifier producing a result of 92% accuracy on the test set. The system 100 can classify each email or other communication in this way. The resulting formality score makes up another variable that influences the heuristic relationship score. The heuristic score can be used to define and weight edges in the relationship graph, for example. The edges can connect nodes that represent different entities and topics that are extracted using entity recognition.

The relationship unit 106 can determine a "Time Known" or duration metric. For each sender and receiver pair in the dataset, the timestamp on each email can be stored in order to determine the time each sender/receiver pair have been in contact. This time span can be documented in the number of days between the first email and last email sent. The number is then converted into a normalized duration score between [0,1] and used as a variable to determine the heuristic relationship score.

The relationship unit 106 can use a Heuristic Function as part of the relationship score measurement. The heuristic function computes the closeness between sender and receiver of each email or other data communication. As an example, for each unique sender/receiver pair, the heuristic scores of all their emails are averaged to produce one final relationship score. Below is a sample code snippet of the heuristic function:

```
def heuristic(theta1, theta2, theta3, sentiment_score, formality_score, time_known):
    """
    Input: Fixed parameters: theta1, theta2, theta3
    Sentiment Score: sentiment_score
    Formality Score: formality_score
    Time known: time_known
    """
    return sentiment_score*theta1 + formality_score*theta2 + time_known*theta3
```

As an example, the relationship model 106 can create a relationship graph with the following fixed parameters based on field surveys and studies:

Where, theta1 is the coefficient for sentiment score and fixed at 0.5 theta2 is the coefficient for formality score and fixed at 0.3 theta3 is the coefficient for duration of contact/relationships score and fixed at 0.2.

The relationship model 106 can choose the coefficients to weigh in the factors such as sentiment, formality and durations based on field studies. As an example, sentiment scores can be given more weight than the formality score of the communication.

The relationship model 106 can include a path unit 122. The path unit 122 can implement the K-shortest Path Algorithm to determine a path between two entities in the relationship graph. The path can be displayed at an interface, for example. Given a dictionary containing the heuristic score between all users, the K-Shortest Path, NP=Complete, Algorithm (an offset of Dijkstra's Algorithm) determines the K—'friendliest' pathways between any two contacts in an organization. This algorithm can be used to provide the most efficient pathways in which people could connect.

Figure 4:
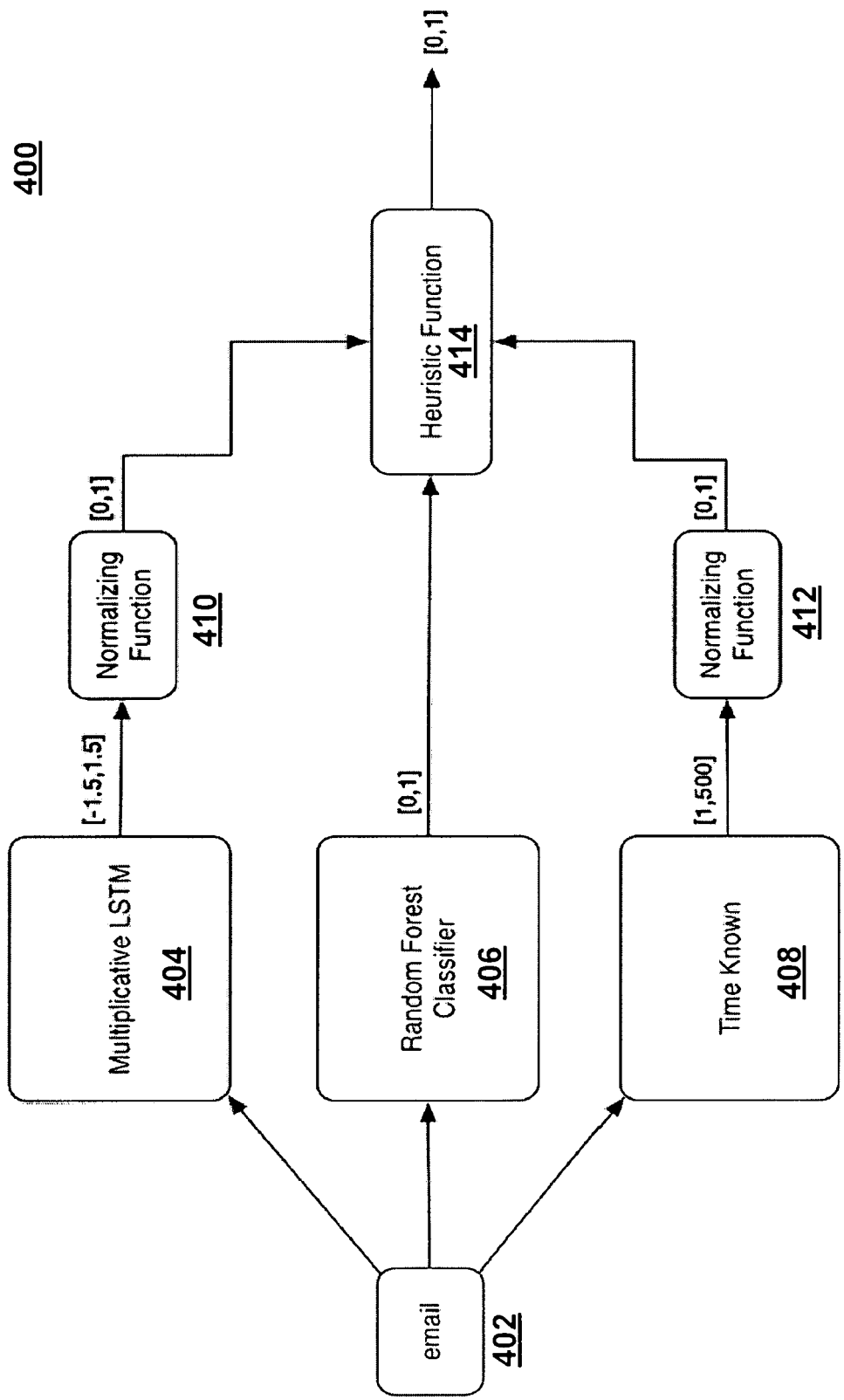
FIG. 4 is an example flowchart diagram of a process for expert knowledge.

FIG. 4 is an example flowchart diagram of a process 400 for generating relationship data for expert knowledge. Long short-term memory (LSTM) is an artificial neural network architecture that supports machine learning. It can use a recurrent neural network (RNN), allowing data to flow both forwards and backwards within the network. A multiplicative LSTM 404 can process electronic communication 402 for sentiment analysis. A normalizing function for 10 can generate a sentiment score for provision to the heuristic function 414. A random forest classifier 406 can be used to generate a formality score for provision to the heuristic function 414. A time known unit 408 can generate a duration score. A normalizing function 412 can generate a formality score for provision to the heuristic function 414. Heuristic function 414 can generate a relationship score using weights and sentiment score, formality score, duration score, and other metrics. The relationship unit 106 can implement the process 400, for example.

The system 100 supports diverse applications 110 across various lines of businesses across any organization. The system 100 generates and updates a knowledge engine 108 which can be used for computer services and applications 110. Example applications 110 include a search engine 136, customized newsletter 138, e-comm (electronic communication) surveillance, and customer relationship management (CRM) enhancement or add-on.

The system 100 can include a search engine 136. The search engine 136 can be built using the knowledge base 108 extracted from communication input data 102 using the entity recognition unit 104 and the relationship model 106. The system 100 can be a platform to connect the knowledge seekers with knowledge providers in an organization. The system 100 can also offers the friendliest path to connect the user to the expert. An interface can display visual elements regarding the path and relationship scores, along with other visual representations of the knowledge base, entities, and topics. For example, a path can connect a requestor that is interested in a topic to an expert entity that is expert in the topic. This search engine 136 offers information on very esoteric topics that are specific to certain organizations and helps in finding people who have expertise in these topics.

The system 100 can generate a personalized newsletter 138: The personalized newsletter 138 uses the knowledge base 108 that was built as a part by the AI techniques and generates customized content for each user based on his/her interests. As compared to a static newsletter that is sent out to all employees, the personalised newsletter 138 is dynamic, customized, and catered to specific interests of each user and provides only relevant information. It also automates the painstaking process of creation of these newsletters manually by selecting topics of interest from communication data (e.g. emails), thus saving time and money.

The system 100 can provide an e-comm (e.g. electronic communication) surveillance tool 140. An organization can use the tool to detect breaches of security or privacy in an organization as well as internal threats such as insider trading and loss of confidential information in capital markets. The current method involves manually looking through millions of emails or other electronic communications by searching for specific keywords. Keyword searching can result in false positives and lost time and resources. There may not be enough manpower available to look through all the false positives resulting in loss of confidential information and thereby threatening internal privacy. Moreover, organizations are spending resources to acquire and test new technologies to accurately detect breaches of security or privacy in an organization.

The e-comm surveillance tool 140 has the potential to reduce the false positives using named entity recognition unit 104 and Word2vec model 126. The system 100 can implement anomaly detection, understand the topics in emails or other electronic communication, and raise a flag if it is in violation of existing market policies.

The system 100 can be used to service other applications 110 and these are examples. For example, the system 100 can be used in Talent Management, HR and Infosec departments in various applications. The power of the system 100 to understand sentiments and relationships can help improve customer relationships and client satisfaction without the need of feedback forms and questionnaires. The system 100 can enrich existing CRM by adding a wealth of knowledge automatically surfaced on a daily basis (e.g. enrich CRM 132).

The system 100 can be trained on various datasets. A pipeline can be created and tested using different source datasets. Creating a pipeline using training datasets can help address privacy and security issues surrounding data. Once the pipeline is built, the system 100 can automatically migrate from one dataset to the other and create the knowledge base 108 with minimum or no human intervention.

Figure 5:
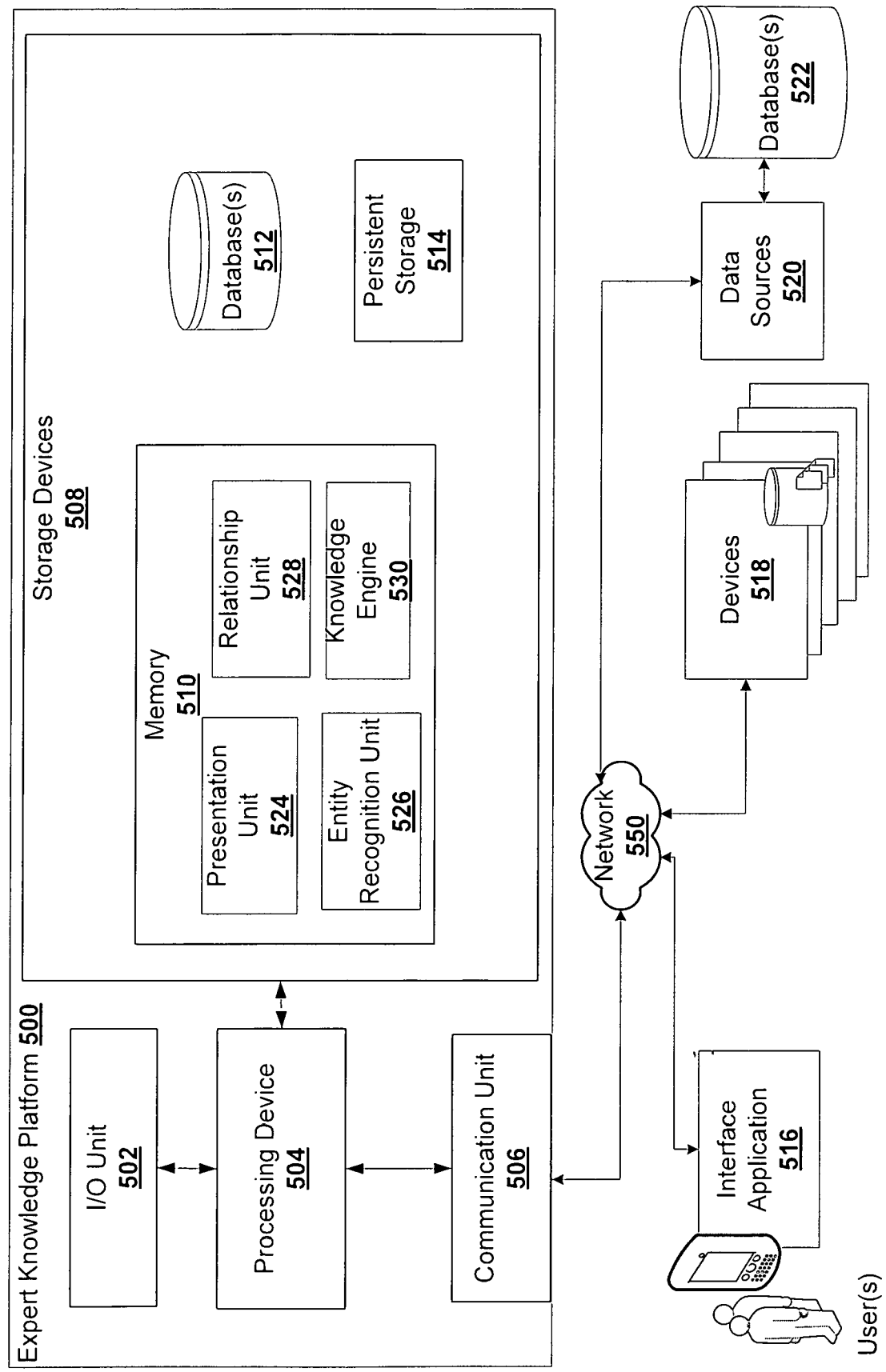
FIG. 5 is an example schematic diagram of a system for expert knowledge.

FIG. 5 is an example flowchart diagram of an expert knowledge platform 500 or system 100. The platform 500 has an interface 502 and a communication unit 506 to receive electronic communication data. The expert knowledge platform has a processing device 504 that interacts with storage device 508 and memory 510. The processing device 504 is configured to provide an entity recognition unit 526 to process the communication data to extract one or more named entities and topics referred to in the electronic communication data. A relationship unit 528 generates a relationship graph and relationship scores between the entities and topics. The knowledge engine 530 uses the entity and relationship data to service a interface application 516.

The presentation server 524 is configured to generate visual effects representing the one or more named entities and topics at the interface application 516. The interface application can relate to a search engine, newsletter, surveillance, or customer service. For example, the knowledge engine 530 can indicate an entity that is expert in topic to a user that has an interest in the top.

The entity recognition unit 526 recognizes the one or more entities and the topics in the communication data using an entity recognizer and a dependency parser, for example. The entity recognition unit 526 can also use topic modelling.

The processor 504 is configured to generate or update one or more knowledge bases in persistent store 514 with the one or more named entities and the topics. The named entity recognition unit 526 validates the one or more entities using a lexical source.

The entity recognition unit 526 extracts the one or more named entities by filtering with a knowledge graph, for example. The named entity recognition unit 526 extracts the one or more named entities by syntactic dependency parsing. The named entity recognition unit 526 extracts the topics by identifying topics with topic modeling.

The relationship unit 528 is configured to generate an expert classifier to classify an expert entity that is expert in a topic of the topics. The electronic communication can have a reference to at least one of a sender and a recipient. The relationship unit 528 can determine a relationship score indicating strength of a relationship between a first entity and a second entity. The first entity can be someone who submits a search engine query for a topic and the second entity can be an expert in the topic. The relationship score can indicate the strength of relationship between the first entity and the expert. This score can also factor in intermediate contacts that can create a path between the first entity and the expert, for example. The relationship unit 528 processes the electronic communication using classification rules to compute the relationship score based on a sentiment score, the classification rules comprising natural language processing rules for sentiment classification.

The relationship unit 528 processes the electronic communication using classification rules to compute the relationship score based on a formality score. The classification rules can involve natural language processing rules for formality classification. The relationship unit 528 processes the electronic communication using classification rules to compute the relationship score based on a duration score. The classification rules can involve rules for time stamp processing and duration calculations. The relationship unit 528 generates a relationship graph and computes one or more paths between the first entity and the second entity. The presentation unit generates a visual element corresponding to the one or more paths and at least a portion of the relationship graph.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A knowledge platform comprising:
   a memory storing a knowledge engine with a dictionary of one or more named entities and one or more topics, and a relationship graph of nodes that correspond to at least some of the named entities and at least some of the topics, and edges that correspond to relationship scores between the entities, wherein the relationship graph defines paths of the nodes and the edges between different entities and topics;
   at least one processor coupled to the memory programmed with executable instructions, the instructions including an interface to receive a request identifying a topic of the one or more topics, the request from a requestor;
   wherein the at least one processor is configured to:
      receive electronic communication data;
      continuously update the knowledge engine by processing the communication data using an entity recognition unit comprising a syntactic dependency parser, a named entity recognizer, and a probabilistic latent semantic analysis model, wherein the syntactic dependency parser parses words within the communication data to recognize the one or more named entities and the one or more topics in the words within the communication data using relationships between the words in the communication data, wherein the named entity recognizer detects and classifies the one or more named entities in the words in the communication data by entity type, the named entity recognizer trained on one or more domain models, and wherein the probabilistic latent semantic analysis model identifies the one or more topics in the communication data and computes relationships between the one or more topics and the named entities, wherein the probabilistic latent semantic analysis model is trained using a vector space and a topic model;

classify, using an expert classifier, an expert entity from the one or more named entities as an expert in the topic of the request based on a threshold metric that relates to expert classification, wherein the processor uses one or more models to convert words to vector representations of the words, and computes one or more metrics using the vector representations to classify the expert entity as the expert in the topic of the request based on the threshold metric, wherein the one or more models are trained on a corpus of text using the one or more named entities and the one or more topics;

generate or update, by processing the communication data using a relationship model, the relationship graph of the nodes that correspond to at least some of the named entities and at least some of the topics in the knowledge engine, and the edges that correspond to the relationship scores between the entities and the topics, wherein each of the one or more relationship scores comprise a sentiment score, a formality score, and a duration score generated from relationship data of the communication data, wherein the relationship graph has a node corresponding to the requestor and a node corresponding to the expert entity;

compute a relationship path between the requestor and the expert entity using one or more edges connecting the node corresponding to the requestor and the node corresponding to the expert entity of the relationship graph, wherein the relationship path is selected from a plurality of different paths connecting the node corresponding to the requestor and the node corresponding to the expert entity of the relationship graph;

generate, using the relationship model and the relationship path between the requester and the expert entity, a relationship score for the requestor and the expert entity indicating strength of a relationship between the requestor and the expert entity, the relationship score generated based on the one or more relationship scores corresponding to the one or more edges between the node corresponding to the requestor and the node corresponding to the expert entity of the relationship graph;

a presentation server configured to generate visual effects representing the one or more named entities and the one or more topics, the relationship path between the requestor and the expert entity classified as the expert in the topic of the request, and the relationship score for the requestor and the expert entity indicating the strength of the relationship between the requestor and the expert entity, wherein the interface transmits the visual effects to a device for display.

2. The platform of claim 1 wherein the processor uses the relationship model to compute the relationship path as an optimal path of a plurality of different paths between the node corresponding to the requestor and the node corresponding to the expert entity using the relationship graph, wherein the presentation unit generates a visual element corresponding to the relationship path and at least a portion of the relationship graph.

3. The platform of claim 1 wherein the processor is configured to use a cosine similarity measure for the expert classifier to classify the expert entity as the expert in the topic.

4. The platform of claim 1 wherein the electronic communication has a reference to at least one of a sender and a recipient, wherein the processor generates additional relationship scores to indicate strength of a relationship between the sender or the recipient and the one or more named entities, wherein the additional relationship scores are used to generate the relationship path between the requestor and the expert entity.

5. The platform of claim 1 wherein the processor is configured to generate or update one or more knowledge bases with the one or more named entities and the topics.

6. The platform of claim 1 wherein the entity recognition unit validates the one or more entities using a lexical source.

7. The platform of claim 1 wherein the entity recognition unit extracts the one or more named entities by filtering the communication data with a knowledge graph to populate a people database, an organization database, and a places database in the memory.

8. The platform of claim 1 wherein the named entity recognition unit finds the one or more topics using topic modeling and filters the topics to populate a topics database in the memory.

9. The platform of claim 1 wherein the relationship model processes the electronic communication using classification rules to compute the relationship score based on a sentiment score using one or more neural networks to classify positive or negative sentiments in the communication data, the classification rules comprising natural language processing rules for sentiment classification.

10. The platform of claim 1 wherein the relationship model processes the electronic communication using classification rules to compute the relationship score based on a formality score using machine learning to classify formal data and informal data in the communication data, the classification rules comprising natural language processing rules for formality classification.

11. The platform of claim 1 wherein the relationship model processes the electronic communication using classification rules to compute the relationship score based on a duration score to classify time data in the communication data, the classification rules comprising rules for time stamp processing and duration calculations.

12. A knowledge platform comprising:
a memory storing a knowledge engine with a dictionary of one or more named entities and one or more topics, and a relationship graph of nodes that correspond to at least some of the named entities and at least some of the topics, and edges that correspond to relationship scores between the entities, wherein the relationship graph defines paths of the nodes and the edges between different entities and topics;
an interface to receive electronic communication data;
at least one processor configured to provide:
an entity recognition unit comprising a syntactic dependency parser, a named entity recognizer, and a probabilistic latent semantic analysis model to process the communication data to continuously update the knowledge engine, wherein the syntactic dependency parser parses words within the communication data for recognizing the one or more named entities and topics within the communication data using relationships between the words in the communication data, wherein the named entity recognizer detects and classifies the named entities in the words in the communication data by entity type, the named entity recognizer trained on one or more domain models, and wherein the probabilistic latent semantic analysis model identifies the one or more topics in the communication data and computes relationships between the one or more topics and the named entities, wherein the probabilistic latent semantic analysis model is trained using a vector space and a topic model;

one or more knowledge bases of the one or more named entities and the topics extracted from the communication data to update the knowledge engine;

a relationship model for processing the communication data to generate or update the relationship graph of the nodes that correspond to at least some of the named entities and at least some of the topics, and the edges that correspond to the relationship scores between the entities and the topics, wherein each of the one or more relationship scores comprise a sentiment score, a formality score, and a duration score generated from relationship data of the communication data, wherein the relationship graph has a node corresponding to a requestor of a topic and a node corresponding to an expert entity, wherein the relationship graph has a relationship path of one or more edges connecting the node corresponding to the requestor and the node corresponding to the expert entity of the relationship graph, wherein the relationship path is selected from a plurality of different paths connecting the node corresponding to the requestor and the node corresponding to the expert entity of the relationship graph, wherein a relationship score for the requestor and the expert entity indicates strength of a relationship between the requestor and the expert entity, wherein the relationship score is generated based on the one or more relationship scores corresponding to the one or more edges between the node corresponding to the requestor and the node corresponding to the expert entity of the relationship graph;

an expert classifier to classify an expert entity from the one or more named entities that is expert in a topic of the topics based on a threshold metric that relates to expert classification, wherein the processor uses one or more models to convert words to vector representations of the words, and computes one or more metrics using the vector representations to classify the expert entity as the expert in the topic of the request based on the threshold metric, wherein the one or more models are trained on a corpus of text using the one or more named entities and the one or more topics; and a presentation server configured to generate visual effects representing the one or more named entities, the one or more topics, the expert entity classified as the expert in the topic of the request, the topic, the relationship path, and the relationship score for the requestor and the expert entity indicating the strength of the relationship between the requestor and the expert entity.

13. The platform of claim 12 wherein the processor computes, using the relationship model, a relationship score indicating strength of a relationship between a first entity and a second entity, first entity and first topic, or first topic and second topic; wherein the visual effects indicate the relationship score and the first entity and the second entity, the first entity and the first topic, or the first topic and the second topic, wherein the relationship model has classification rules to compute the relationship score based on a sentiment score, a formality score, and a duration score, the classification rules comprising natural language processing rules for sentiment classification, formality classification, duration calculations.

14. The platform of claim 12 wherein the named entity recognition unit extracts the one or more named entities by filtering the communication data with a knowledge graph to populate a people database, an organization database, and a places database in the memory.

15. The platform of claim 12 wherein the named entity recognition unit finds the one or more named entities by identifying entities with topic modeling and filters the topics to populate a topics database in the memory.

16. The platform of claim 12 wherein the relationship unit generates the relationship graph and computes one or more paths between the first entity and the second entity, wherein the presentation unit generates a visual element corresponding to the one or more paths and at least a portion of the relationship graph.

17. The platform of claim 12 wherein the processor is configured to use a cosine similarity measure for the expert classifier to classify the expert entity that is expert in the topic.

18. A method comprising:

storing a knowledge engine with a dictionary of one or more named entities and one or more topics, and a relationship graph of nodes that correspond to at least some of the named entities and at least some of the topics, and edges that correspond to relationship scores between the entities, wherein the relationship graph defines paths of the nodes and the edges between different entities and topics;

receiving electronic communication data;

continuously updating the knowledge engine by processing the communication data using a syntactic dependency parser that parses words within the communication data to recognize the one or more named entities and topics in the words in the electronic communication data using relationships between the words in the communication data, using a named entity recognizer for detecting and classifying the named entities in the words in the communication data by entity type, the named entity recognizer trained on one or more domain models, and using a probabilistic latent semantic analysis model for identifying the one or more topics in the communication data and computing relationships between the one or more topics and the named entities using a vector space and a topic model;

receiving a request identifying a topic of the one or more topics, the request from a requestor;

determining an expert entity for a topic based on a threshold metric that relates to expert classification using one or more models to convert words to vector representations of the words, and computing one or more metrics using the vector representations to classify the expert entity as the expert in the topic of the request based on the threshold metric, wherein the one or more models are trained on a corpus of text using the one or more named entities and the one or more topics;

generating or updating, by processing the communication data using a relationship model, the relationship graph of the nodes that correspond to at least some of the named entities and at least some of the topics, and the edges that correspond to the relationship scores between the entities and the topics, wherein each of the one or more relationship scores comprise a sentiment score, a formality score, and a duration score generated from relationship data of the communication data, wherein the relationship graph has a node corresponding to a requestor of a topic and a node corresponding to the expert entity;

computing a relationship path between the requestor and the expert entity using one or more edges connecting the node corresponding to the requestor and the node corresponding to the expert entity of the relationship graph, wherein the relationship path is selected from a plurality of different paths connecting the node corresponding to the requestor and the node corresponding to the expert entity of the relationship graph;

generating a relationship score for the requestor and the expert entity indicating strength of a relationship between the requestor and the expert entity classified as the expert in the topic of the request, the relationship score generated based on the one or more relationship scores corresponding to the one or more edges between the node corresponding to the requestor and the node corresponding to the expert entity of the relationship graph;

updating a knowledge engine with the expert entity, the one or more named entities and topics; and providing an application that generates visual effects representing the expert entity; the one or more named entities and topics, the relationship path, and the relationship score for the requestor and the expert entity indicating the strength of the relationship between the requestor and the expert entity.

* * * * *